(12) United States Patent
Belik et al.

(10) Patent No.: US 8,237,747 B2
(45) Date of Patent: Aug. 7, 2012

(54) METHOD OF CONVERTING SIGNALS FOR MULTI-PRIMARY COLOR DISPLAY

(75) Inventors: Oleg Belik, Eindhoven (NL); Claus Nico Cordes, Eindhoven (NL); Gerben Johan Hekstra, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1096 days.

(21) Appl. No.: 11/910,472

(22) PCT Filed: Mar. 31, 2006

(86) PCT No.: PCT/IB2006/050974
§ 371 (c)(1),
(2), (4) Date: Oct. 2, 2007

(87) PCT Pub. No.: WO2006/106457
PCT Pub. Date: Oct. 12, 2006

(65) Prior Publication Data
US 2008/0252658 A1    Oct. 16, 2008

(30) Foreign Application Priority Data

Apr. 4, 2005  (EP) .................................. 05102641

(51) Int. Cl.
*G09G 5/10*   (2006.01)

(52) U.S. Cl. ................... 345/690; 345/600; 345/589

(58) Field of Classification Search ............. 345/690, 345/76–83, 87–90, 694, 698, 214, 36, 589–593, 345/600–605

See application file for complete search history.

(56) References Cited

U.S. PATENT DOCUMENTS

| | | | |
|---|---|---|---|
| 5,416,890 A * | 5/1995 | Beretta | 345/590 |
| 5,929,843 A * | 7/1999 | Tanioka | 345/600 |
| 6,262,744 B1 | 7/2001 | Carrein | |
| 6,437,792 B1 * | 8/2002 | Ito et al. | 345/600 |
| 6,570,584 B1 | 5/2003 | Cok et al. | |

(Continued)

FOREIGN PATENT DOCUMENTS

JP    06261332 A    12/1994

OTHER PUBLICATIONS

Ajito et al: "Color Conversion Method for Multiprimary Display Using Matrix Switching"; Optical Review, JP, Vol. 8, No. 3, 2001, pp. 191-197, XP008040400.

*Primary Examiner* — Jason Mandeville

(57) ABSTRACT

A method is described which converts a three primary color input signal (Cx, Cy, Cz) into N drive signals (P1, ..., PN) to drive N>3 primary colors of a multi-primary color display (3). The method determines (1) a valid range (VS) wherein the N drive signals (P1, ..., PN) have valid values by performing the steps of (i) defining 3 functions representing 3 of the drive signals (P1, P2, P3) as a function of the remaining N–3 drive signal(s) (P4, ..., PN), and (ii) calculating (1) a common range in a space formed by the N–3 drive signal(s) (P4, ..., PN) wherein each one of the 3 functions has valid values. The method selects (2) a point from the common range to determine the N drive signals (P1, ..., PN).

10 Claims, 2 Drawing Sheets

U.S. PATENT DOCUMENTS

| | | | |
|---|---|---|---|
| 6,633,302 B1* | 10/2003 | Ohsawa et al. | 345/604 |
| 6,724,934 B1* | 4/2004 | Lee et al. | 382/167 |
| 7,301,543 B2* | 11/2007 | Higgins | 345/589 |
| 7,403,205 B2* | 7/2008 | Zeng | 345/590 |
| 7,598,961 B2* | 10/2009 | Higgins | 345/589 |
| 7,714,824 B2* | 5/2010 | Roth | 345/88 |
| 7,728,846 B2* | 6/2010 | Higgins et al. | 345/600 |
| 7,932,883 B2* | 4/2011 | Klompenhouwer et al. | 345/88 |
| 7,956,877 B2* | 6/2011 | Belik et al. | 345/690 |
| 8,044,967 B2* | 10/2011 | Belik et al. | 345/589 |
| 8,085,277 B2* | 12/2011 | Schoner | 345/590 |
| 8,115,787 B2* | 2/2012 | Ben-Chorin et al. | 345/690 |
| 8,120,627 B2* | 2/2012 | Belik et al. | 345/690 |
| 2003/0098928 A1 | 5/2003 | Kim | |
| 2004/0222999 A1* | 11/2004 | Choi et al. | 345/589 |
| 2004/0252130 A1 | 12/2004 | Lee et al. | |
| 2005/0031199 A1 | 2/2005 | Ben-Chorin et al. | |
| 2005/0083352 A1* | 4/2005 | Higgins | 345/690 |
| 2005/0099426 A1* | 5/2005 | Primerano et al. | 345/589 |
| 2005/0152597 A1* | 7/2005 | Spaulding et al. | 382/162 |
| 2005/0212728 A1* | 9/2005 | Miller et al. | 345/76 |
| 2006/0274212 A1* | 12/2006 | Lo et al. | 348/650 |
| 2008/0186327 A1* | 8/2008 | Belik et al. | 345/603 |
| 2008/0225056 A1* | 9/2008 | Belik et al. | 345/604 |

\* cited by examiner

METHOD OF CONVERTING SIGNALS FOR MULTI-PRIMARY COLOR DISPLAY

FIELD OF THE INVENTION

The invention relates to a method of converting a three primary color input signal into N drive signals for driving N>3 primary colors of a multi-primary color display. The invention further relates to a system for converting a three primary color input signal into N drive signals, and to a display apparatus comprising this system.

BACKGROUND OF THE INVENTION

U.S. Pat. No. 6,570,584 discloses an OLED display device with more than the conventional red, green, and blue sub-pixels. The additional sub-pixel may have a color selected outside the color gamut possible with the red, green, and blue sub-pixels to obtain a wider color gamut. The display system uses a conventional RGB input signal to create an appropriate multi-color signal for driving all the sub-pixels. Alternatively, the additional sub-pixel may have a color inside the color gamut possible with the red, green, and blue sub-pixels to increase the efficiency and lifetime of the display.

A color data transformation circuit converts the input signal to values necessary for controlling each of the sub-pixels. The transformation circuit calculates the appropriate amounts of light from each of the three available sub-pixel colors to reproduce the desired color at each of the four sub-pixels using well known matrix transforms or lookup tables. The amount of light produced by a sub-pixel depends on a numerical value supplied to the sub-pixel. The numerical value is, for example an eight or six bit value. In general, many different possibilities exist to transform the input signal to the drive values of the sub-pixels.

A transformation circuit which performs matrix transformations has the drawback that a lot of matrix multiplications are required. Either an expensive and fast calculation circuit is required or an algorithm has to be constructed to pre-calculate the majority of the computationally intensive mathematical calculations to enable real time operation. A pre-calculation and a transformation circuit which uses look-up tables have the drawback that the algorithm is pre-fixed to one of the possible solutions.

SUMMARY OF THE INVENTION

It is an object of the invention to provide a method of converting a three primary color input signal into N drive signals for driving N>3 primary colors of a multi-primary color display which has a high flexibility in selecting out of the possible solutions.

A first aspect of the invention provides a method of converting a three primary color input signal into N drive signals for driving N>3 primary colors of a multi-primary color display. A second aspect of the invention provides a system for converting a three primary color input signal into N drive signals for driving N>3 primary colors of a multi-primary color display. A third aspect of the invention provides a display apparatus comprising such a system.

The method in accordance with the first aspect of the invention converts a three primary color input signal into N drive signals which drive N>3 primary colors of a multi-primary color display. The three primary color input signal usually is a RGB signal, but any other signal which defines the drive signals of a display which has pixels with three differently colored sub-pixels may be used instead. The N drive signals are supplied to the more than 3 sub-pixels of the multi-primary color display. Usually, the multi-primary color display has, per pixel, the three standard RGB sub-pixels and at least one further sub-pixel with a different color. The different color may be selected inside or outside the color gamut defined by the RGB sub-pixels. The different color may be white.

The method determines a valid range wherein the N drive values have valid values. Three functions are defined which represent 3 of the drive signals as a function of the remaining N−3 drive signal(s). The valid ranges of the N−3 drive signal(s) are calculated taking the valid ranges of the 3 drive signals into account. A valid range of drive values is the range to which the values of the drive values are restricted. Usually, the valid range is determined by the number of bits available for the values. For example, if 8 bits words are used, the valid range ranges from 0 to 255, including the border values. Alternatively, in an analog implementation, the valid range usually is limited by a minimum and maximum possible voltage. To ease the calculations, often a normalized valid range is used which ranges from 0 to 1, including the border values, and which is independent of the actual digital or analog drive range. The last "s" of the N−3 drive signal(s) is put between brackets to indicate that if N=4 only one remaining drive signal is present, while if N>4 a plurality of remaining drive signals is present.

The valid drive values of the N−3 drive signal(s) are determined by taking into account valid drive ranges of the 3 drive signals. Each one of the 3 functions is defined by values formed a space together with the N−3 drive signal(s). Thus, for each one of the 3 functions is determined in which range of the space formed by the N−3 drive signal(s) the functions have valid values. The common part in the space formed by the N−3 drive signals of the valid ranges found for the 3 drive signals is the valid range of the N−3 drive signal(s). This valid range of the N−3 drive signal(s) is a line part if N=4, a two-dimensional area if N=5, a three-dimensional volume if N=6, or a multi-dimensional volume if N>6. The valid range directly indicates which possible selections of the N−3 drive signals are possible in the conversion.

Once the valid range of the N−3 drive signal(s) is calculated, a point out of this range is selected. The selected point immediately defines the values of the N−3 drive signal(s). The values of the remaining 3 drive signals are determined by substituting the selected values of the N−3 drive signal(s) in the 3 functions.

This approach does not require calculating the N drive signals with matrix operations or with look up tables. Instead, only the intersections of the 3 functions with the borders of the valid ranges of these 3 functions have to be calculated. These intersections provide values in the space defined by the N−3 drive signal(s) which are used to determine the common area. Thus, reasonably simple operations which can be performed in real-time suffice. If N=4, the 3 functions defining the three drive signals as a function of the fourth drive signal are straight lines. Now, only intersections of these lines with the border lines indicating the borders of the valid values of the respective drive signals have to be determined. If N=5, the 3 functions defining the three drive signals as a function of the fourth and the fifth drive signals are planes. Now, only intersections of these planes with the border planes defining the border values have to be calculated to determine the resultant border lines in the space defined by the fourth and the fifth drive signal. This approach can be extended to N>5.

Once this valid common range in the N−3 space is determined, the algorithm has the flexibility to select a particular point out of this range. This provides the flexibility to adapt, in real time, the selection to changing situations.

In an embodiment in accordance with the invention, each of the three functions is defined as a sum of one of the colors of the input signal and a linear combination of the N−3 drive signals(s). The weighting factors of the linear combination are coefficients defined by the color points of the N sub-pixels. Thus, if the color points do not vary in time or with temperature, the coefficients are predetermined fixed values.

In an embodiment in accordance with the invention, the selection of the point in the common range is performed under a constraint for at least one aspect of the 3 drive signals. Due to the relatively low computational effort required to determine the common range of drive values, a real time calculation is possible. When the common range has been determined, it is possible to select an appropriate point from this range to calculate the N drive signals. This selection can be performed under a constraint which is fixed on beforehand, or which is determined in real-time. The first approach has the advantage that a real-time algorithm can be used without requiring a complex and expensive converter. The second approach has the advantage that the real-time algorithm has a high flexibility because it is possible to cater in real-time for changes of the constraint.

In an embodiment in accordance with the invention, the point is selected from the common range such that the value of one of the drive signals is minimal. The minimal drive of this particular one of the drive signals allows maximizing its lifetime. This is particularly interesting if the sub-pixels associated with this particular drive signal have a shorter lifetime than the other sub-pixels.

In an embodiment in accordance with the invention, the point is selected from the common range such that a real-time varying constraint is met. The constraint may be determined by the temperature of the display, an amount of ambient light impinging on the display, aging of the display, or a power consumption of the display.

In an embodiment in accordance with the invention, preferred functions are defined if four drive voltages are required to drive pixels which have four sub-pixels.

In an embodiment in accordance with the invention, because the 3 functions define the 3 drive values as a linear function of the fourth drive value, the common range is a line segment on the line indicating values of the fourth drive value. The common range is the overlap of the valid ranges of the 3 functions on the line indicating the values of the fourth drive value.

In an embodiment in accordance with the invention, the valid range on the line indicating the values of the fourth drive value is determined for each one of the 3 functions by calculating the values of the fourth drive value where each one of the 3 functions reaches the borders of the valid range of their values.

In an embodiment in accordance with the invention, the drive ranges are normalized such that the border values are zero and one, respectively. This simplifies the algorithm in that it is not required to adapt the algorithm to the actual ranges used. The actual ranges usually depend on the particular application. Further, the determination of the fourth drive values where each one of the 3 functions reaches the borders of the valid range is simplified to solving the equations for the values zero and one, respectively, of the functions.

The system of claim 10 may be a system realized by hardware or by software or a combination thereof. The hardware may be included in an integrated circuit or may be a combination of electronic components.

The system may also be a computer program product comprising a program for performing the steps as claimed in claim 1.

These and other aspects of the invention are apparent from and will be elucidated with reference to the embodiments described hereinafter.

DETAILED DESCRIPTION OF THE PREFERRED EMBODIMENT

Figure 1:
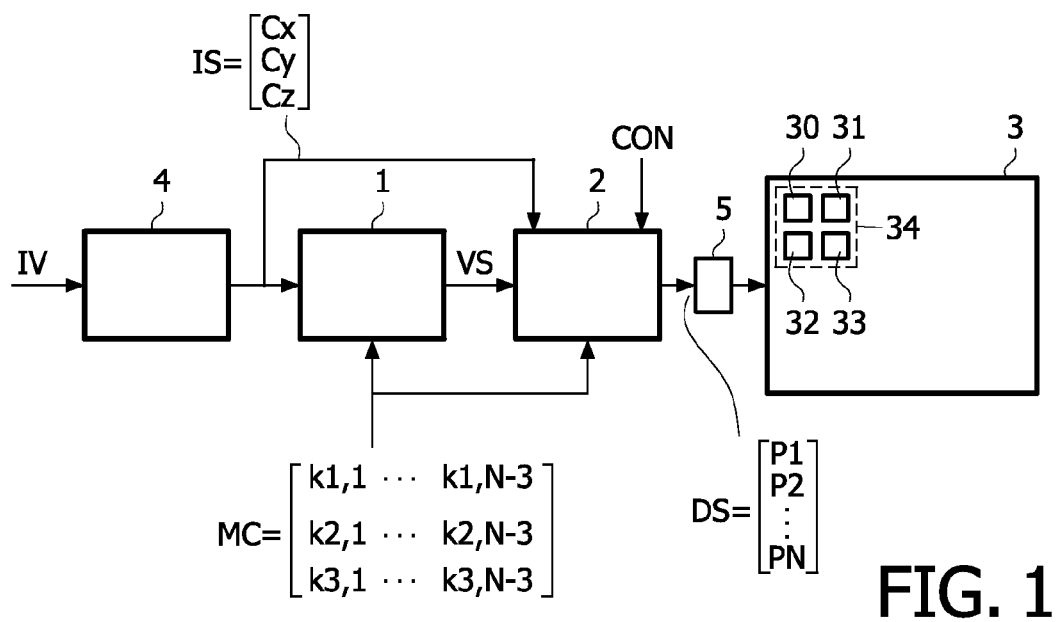
FIG. 1 shows a schematical block diagram of a display device comprising a converter in accordance with the invention.

FIG. 1 shows a schematical block diagram of a display device comprising a converter in accordance with the invention. The display device comprises a signal processing circuit 4, the converter, and a display 3.

The converter comprises a valid range determining function 1, further referred to as the range function 1, a selection function 2, and a display drive function 5.

The signal processing circuit 4 receives an image input signal IV and supplies the primary color input signal Cx, Cy, Cz. The range function 1 receives the three input signals Cx, Cy, Cz and a coefficient matrix MC to supply the common range VS of the N−3 drive values P4 to PN. The three input signals Cx, Cy, Cz are commonly referred to as IS, and are usually the RGB signals, but may be other signals defining the amount of light of the three sub-pixels per pixel of a standard three sub-pixel display. In accordance with the present invention, these three input signals IS have to be transformed into, or mapped on, drive signals P1 to PN for the N>3 sub-pixels 30 to 33 per pixel 34 of the more than three sub-pixel display 3. In FIG. 1, by way of example, each pixel 34 comprises four sub-pixels 30 to 33. The drive signals P1 to PN are collectively also referred to as DS. The range function 1 uses three functions which each define one of the three drive values P1 to P3 as a function of the input signals IS and the remaining N−3 drive values P4 to PN. It has to be noted that the remaining drive values P4 to PN may be a single fourth drive value if N=4. The coefficient matrix MC is defined by the color points of the N sub-pixels.

Figure 2:
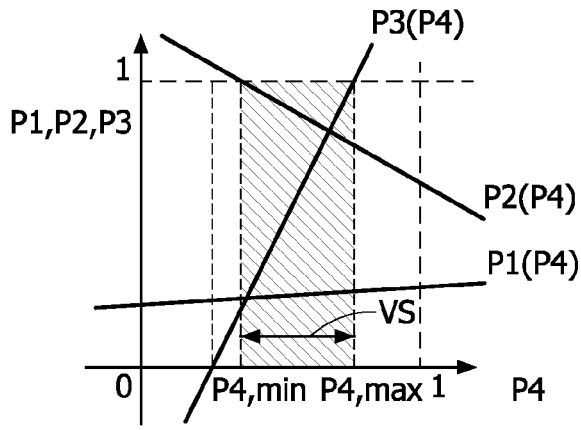
FIG. 2 shows an example of the determination of the common range in a converter which has to convert the three color input signal into four drive signals for four sub-pixels.
Figure 3:
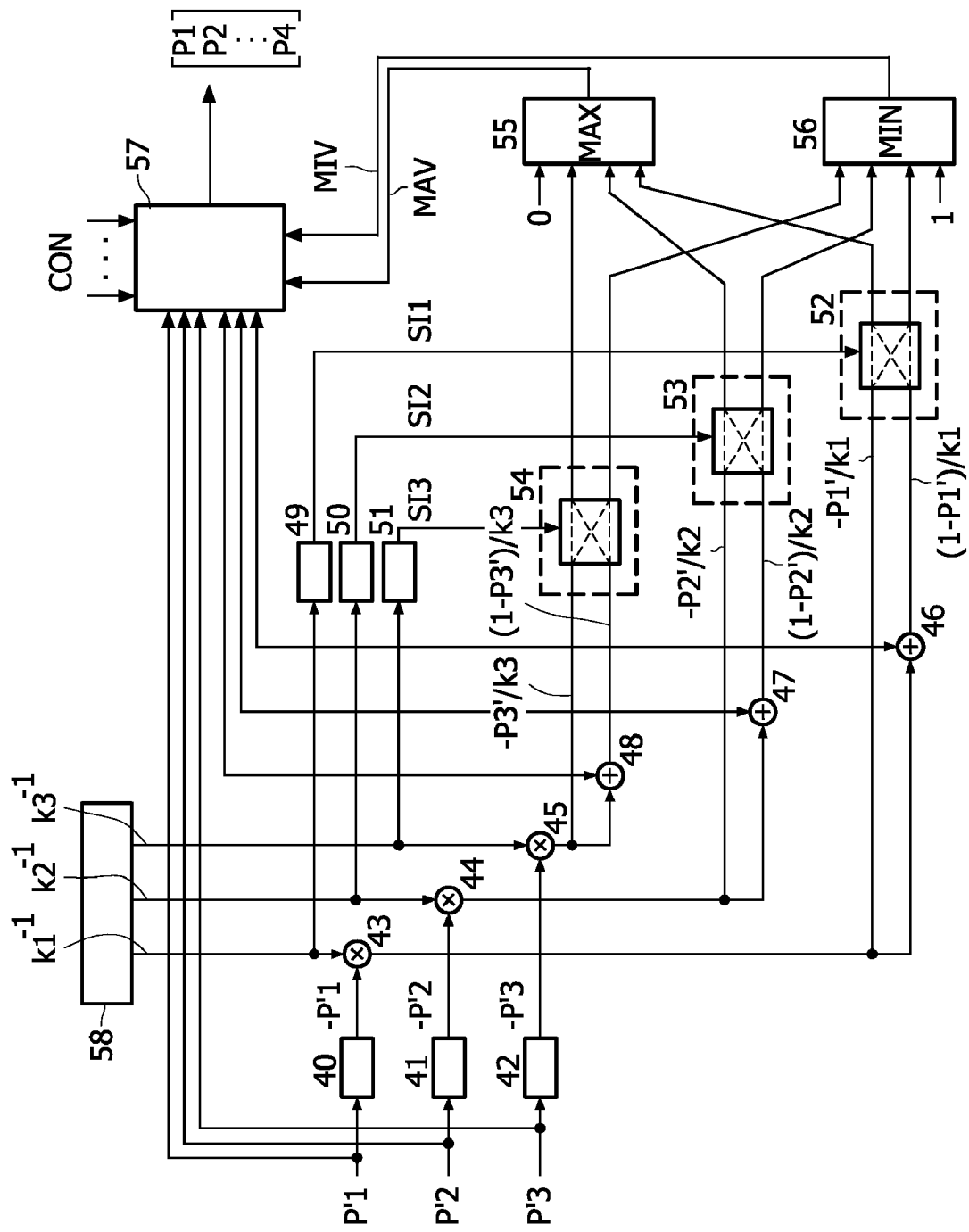
FIG. 3 shows a more detailed block diagram of a converter for a three to four primary conversion using static and/or dynamic constraints.

The operation of the range function 1 is detailed for normalized drive values with respect to the example for the three to four primary conversion (N=4) in FIG. 2, and the example for the three to five primary conversion (N=5) in FIG. 3. From the elucidation of these examples it is clear how the range function 1 has to operate for N>5.

The selection function 2 receives the valid range VS, the input signals IS, the coefficient matrix MC, and an optional selection criterion or constraint CON to supply the N drive signals DS via the display drive function 5 to the sub-pixels 30 to 33 of the display 3. The display drive function 5 may comprise a gamma function when the operations in front of the display drive function 5 are performed in the linear light domain.

FIG. 2 shows an example of the determination of the common range in a converter which has to convert the three color input signal into four drive signals for four sub-pixels. The fourth drive signal P4 is depicted along the horizontal axis, and the three drive signals P1 to P3 along the vertical axis. The three drive signals P1 to P3 are defined as functions P1(P4) to P3(P4) of the fourth drive signal P4. The common range VS of the fourth drive signal P4 in which all the three drive signals P1 to P3 have values within their valid ranges runs from the value P4,min to P4,max.

Preferably, the functions defining the three drive signals P1 to P3 are defined by $$\begin{bmatrix} P1 \\ P2 \\ P3 \end{bmatrix} = \begin{bmatrix} P1' \\ P2' \\ P3' \end{bmatrix} + \begin{bmatrix} k1,1 & \ldots & k1,N-3 \\ k2,1 & \ldots & k2,N-3 \\ k3,1 & \ldots & k3,N-3 \end{bmatrix} \times \begin{bmatrix} P4 \\ \ldots \\ PN \end{bmatrix}$$

wherein P1 to PN are the N drive signals, (P1', P2', P3') are defined by the input signal IS, and the coefficients $k_{i,j}$ of the matrix MC define a dependence between 3 primaries associated with the 3 drive values P1 to P3, and the N−3 other primaries associated with the N−3 drive signal(s) P4 to PN. For N=3, P1', P2', P3' are identical to P1, P2, P3, respectively.

To further elucidate the relation between the elements of these functions it is now shown for the example of a three to four primary conversion how the above functions relate to the standard three to four primary conversion. In a standard three to four primary conversion, the drive signal DS, which comprises the drive signals P1 to P4, is transformed to the linear color space XYZ by the following matrix operation.

$$\begin{bmatrix} Cx \\ Cy \\ Cz \end{bmatrix} = \begin{bmatrix} t11 & t12 & t13 & t14 \\ t21 & t22 & t23 & t24 \\ t31 & t32 & t33 & t34 \end{bmatrix} \times \begin{bmatrix} P1 \\ P2 \\ P3 \\ P4 \end{bmatrix} \quad \text{Equation 1}$$

The matrix with the coefficients $t_{ij}$ defines the color coordinates of the four primaries of the four sub-pixels. The drive signals P1 to P4 are unknowns which have to be determined by the multi-primary conversion. This equation 1 cannot be solved immediately because there are multiple possible solutions as a result of introducing the fourth primary.

The question solved in the present invention is how to make an algorithm that efficiently deals with the freedom in conversion and which is efficient such that a real-time determination of the common range is possible. Preferably, also a real-time selection out of these possibilities for the drive values of the drive signals P1 to P4 is possible. It is known to use particular constraints applied to the algorithm to reduce or even eliminate the freedom of selection. However, these constraints are "hard-embedded" in the algorithm and cannot be changed in response to the determined possible drive values such that a real-time varying constraint determines the selection.

Equation 1 can be rewritten into:

$$\begin{bmatrix} Cx \\ Cy \\ Cz \end{bmatrix} = [A] \times \begin{bmatrix} P1 \\ P2 \\ P3 \end{bmatrix} + \begin{bmatrix} t14 \\ t24 \\ t34 \end{bmatrix} \times P4 \quad A = \begin{bmatrix} t11 & t12 & t13 \\ t21 & t22 & t23 \\ t31 & t32 & t33 \end{bmatrix} \quad \text{Equation 2}$$

wherein the matrix [A] is defined as the transforming matrix in the standard three primary system. Multiplication of the terms of equation 2 with the inverse matrix $[A^{-1}]$ provides Equation 3.

$$\begin{bmatrix} P1' \\ P2' \\ P3' \end{bmatrix} = \begin{bmatrix} P1 \\ P2 \\ P3 \end{bmatrix} + [A^{-1}] \times \begin{bmatrix} t14 \\ t24 \\ t34 \end{bmatrix} \times P4 \quad \text{Equation 3}$$

The vector [P1' P2' P3'] represents primary values as they would be if the display system only contains three primaries. Finally, Equation 3 is rewritten into Equation 4.

$$\begin{bmatrix} P1 \\ P2 \\ P3 \end{bmatrix} = \begin{bmatrix} P1' \\ P2' \\ P3' \end{bmatrix} + \begin{bmatrix} k1 \\ k2 \\ k3 \end{bmatrix} \times P4 \quad \text{Equation 4}$$

Thus, the driving signal of any three primaries P1 to P3 is expressed by Equation 4 as a function of the fourth primary P4. The coefficients k1 to k3 are equal to the inverse matrix $A^{-1}$ multiplied by the respective coefficients t14 to t34. These linear functions define three lines in a 2 dimensional space defined by the fourth primary P4 and the values of the fourth primary P4 as is illustrated in FIG. 2. All values in FIG. 2 are normalized which means that the values of the four drive values P1 to P4 have to be within the range $0 \leq P_i \leq 1$, with Pi being one of the drive values P1 to P4. From FIG. 2 it directly becomes clear visually what the common range VS of P4 is for which all the functions P1 to P3 have values which are in the valid range.

Basically, if no such common range VS exists, then the input color is outside the four primary color gamut and thus cannot be correctly reproduced. For such colors a clipping algorithm should be applied which clips these colors to the gamut.

A scheme which calculates the common range P4,min to P4,max is elucidated with respect to FIG. 3.

FIG. 3 shows a more detailed block diagram of a converter for a three to four primary conversion using static and/or dynamic constraints.

As is clear from FIG. 2, the boundary values P4,min and P4,max of the common range VS of the drive signal P4 may be determined as elucidated in the now following. Firstly, for each one of the 3 drive signals P1 to P3 a minimum boundary value and a maximum boundary value is determined:

if ki>0, and the line defining a particular drive signal Pi is inclining, a minimum boundary value of the valid range for this Pi is: −Pi'/ki, ki is one of the coefficients k1 to k3, a maximum boundary value of the valid range for this Pi is: (1−Pi')/ki if ki<0, and the line defining a particular drive signal P is descending, a maximum boundary of the valid range for this Pi is: −Pi'/ki a minimum boundary of the valid range for this Pi is: $(1-P_i')/k_i$ Secondly, also the values of the drive signal P4 have to be within the valid range of values:

$$0 \leq P4 \leq 1.$$

Thirdly, the common range VS of values of the drive signal P4 is determined by selecting the maximum value of the minimum boundary values and the minimum value of the maximum boundary values. This is now further elucidated by describing the block diagram shown in FIG. 3 in detail.

An inverter 40 receives the signal P1' to supply the negative value −P1' of the signal P1'. An inverter 41 receives the signal P2' to supply the negative value −P2' of the signal P2'. An inverter 42 receives the signal P3' to supply the negative value −P3' the signal P3'.

A multiplier 43 receives the negative value −P1' and the coefficient 1/k1 to supply the signal −P1'/k1. A multiplier 44 receives the negative value −P2' and the coefficient 1/k2 to supply the signal −P2'/k2. A multiplier 45 receives the negative value −P3' and the coefficient 1/k3 to supply the signal −P3'/k3. The coefficients 1/k1, 1/k2, 1/k3 or k1, k2, k3 may be stored in a memory 58.

An adder 46 sums the coefficient 1/k1 to the signal −P1'/k1 to obtain the signal (1−P1')/k1. An adder 47 sums the coefficient 1/k2 to the signal −P2'/k2 to obtain the signal (1−P2')/k2. An adder 48 sums the coefficient 1/k3 to the signal −P3'/k3 to obtain the signal (1−P3')/k3.

A sign circuit 49 receives the coefficient 1/k1 or the coefficient k1 to generate a sign signal SI1 which indicates whether the coefficient 1/k1 or k1 is positive or negative. A sign circuit 50 receives the coefficient 1/k2 or k2 to generate a sign signal SI2 which indicates whether the coefficient 1/k2 or k2 is positive or negative. A sign circuit 51 receives the coefficient 1/k3 or k3 to generate a sign signal SI3 which indicates whether the coefficient 1/k3 or k3 is positive or negative. A positive coefficient indicates that the drive signal P1, P2, P3 as function of the drive value P4 is an inclining line, and a negative coefficient indicates that the drive signal P1, P2, P3 as function of the drive value P4 is a descending line.

A switch circuit 52 receives the sign signal SI1, the signal −P1'/k1, and the signal (1−P1')/k1. If the sign signal SI1 indicates that 1/k1 is positive, the signal −P1'/k1 is supplied to the circuit 55, and the signal (1−P1')/k1 is supplied to the circuit 56. If the sign signal SI indicates that 1/k1 is negative, the signal (1−P1')/k1 is supplied to the circuit 55, and the signal P1'/k1 is supplied to the circuit 56.

The circuit 55 determines the maximum value MAV of all the input values received for the three drive signals P1 to P3 to determine the left border value P4,min of the common range on the axis P4. The circuit 56 determines the minimum value MIV of all the input values received for the three drive signals P1 to P3 to determine the right border value P4,max of the common range on the axis P4. The select circuit 57 receives the values P1' to P3', the coefficients 1/k1 to 1/k3 or k1 to k3, and optional constraints CON to calculate the drive signals P1 to P4 in accordance with Equation 4. The select circuit 57 selects out of the common range VS which is defined as the values of P4 which are in the range P4,min to P4,max, including the border values, the actual value of P4 which will be used to calculate the drive values of the drive signals P1 to P3 by substitution of the actual value of P4 in the Equation 4. The selection of the actual value of P4 may depend on the constraints CON.

By applying additional constraints CON to the determined possible mapping interval VS (the common values of P4) an optimal solution can be selected fitting the constraints CON. This selection can be performed on software level which is easily adaptable. As is shown, by way of example, for the three to four primary conversion in FIG. 3, the algorithm used can be performed with a simple and efficient implementation in hardware or software. No costly look-up tables or high intensity calculations are required. Further, the algorithm is able to adapt to static or even dynamic constraints CON.

An example of such a static constraint is to select a point from the common range VS such that a particular primary P1 to P4 has a minimum drive value. This algorithm is particularly simple if the primary which should have the minimum drive value is the drive signal P4. For example, in a multi-primary OLED display, in which typically the blue primary has the shortest lifetime, the drive signal for the blue OLED is selected to be the drive signal P4. Now, the minimum value P4,min of the common range is selected and the lifetime of the blue OLED is maximized while still the correct color is displayed.

Most interesting is the possibility to adapt the selection to dynamic constraints CON. This allows a real-time adaptation of the multi-primary conversion to, for example, temperature, ambient lighting, power consumption or display aging. Such a real-time adaptation is not possible in prior art algorithms with fixed build in constraints. A real-time adaptation is for example especially relevant if the primary intensities vary with time.

Efficient constrained clipping could require both static and dynamic constraints. Typically, color clipping is not a trivial task for multi-primary applications, since it has to efficiently deal with colors which are outside the display gamut. The clipped value should be perceived as similar to the input color as possible. This similarity is defined by different perception constraints, which can be either objective or subjective. Knowing the dependence between the primaries and using perception constraints, it is possible to determine the optimum clipped value.

Thus, the proposed algorithm can be efficiently used in any application which requires a multi-primary conversion, for example, in a multi-primary monitor or television display, or mobile applications such as, for example, a mobile phone or a PDA.

Figure 4:
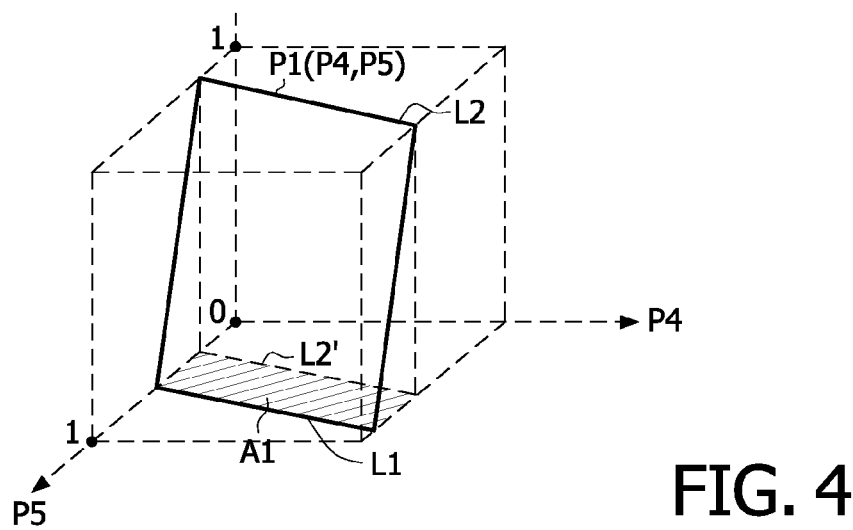
FIG. 4 shows an example for elucidating the determination of the common range in a converter which has to convert the three color input signal into five drive signals for five sub-pixels.

FIG. 4 shows an example for elucidating the determination of the common range in a converter which has to convert the three color input signal into five drive signals for five sub-pixels. If the three input signals have to be converted into five drive signals, the three functions which define the relation between the three drive signals P1 to P3 and the other two P4, P5 are planes in the three-dimensional space formed by the two drive signals P4, P5 and the values of the three functions. Just for simplicity, only one of the planes defined by one of the three functions is shown. The function shown is the plane defining the values of the drive signal P1 as a function P1(P4, P5) of the drive signals P4 and P5. The valid range of the two drive signals P4, P5 due to the valid range of this function is the hatched area A1 in the plane defined by these two drive signals P4, P5. This hatched area A1 is obtained by determining the valid range of the function defining the drive signal P1. This valid range A1 of the drive signal P1 is bounded by the intersection lines L1 and L2 of the plane where the values of the drive signal P1 are the border values zero and one, respectively. The line L1 already is present in the plane formed by the drive signals P4, P5, and the line L2 has to be projected on the plane defined by the drive signals P4, P5 to obtain the line L2'. The area between the lines L1 and L2' bounded by the border values zero and one of the drive signals P4, P5 are the valid range of the drive signals P4, P5 caused by the valid range of the drive signals P1. In a same way, but for reasons of clarity not shown in FIG. 4, the valid ranges (areas in the P4, P5 plane) of the drive signals P4, P5 can be obtained for the drive signals P2 and P3. The common, overlapping part of these three valid ranges in the P4, P5 plane defines the common rang VS from which the drive values of the drive signals P4 and P5 can be selected. Once a point is selected in the common range VS, the other drive signals P1 to P3 can be calculated by substituting the values of P4 and P5 of the point selected in the three functions. It has to be noted that the common range VS is: a range on a line if N=4 (see FIG. 2), an area in a plane if N=5 (see FIG. 4) or a three or more dimensional volume if N>5. For N>5 the determination of the common range VS is performed by first determining for each of the three functions the borders of their valid ranges in the space defined by the N−3 remaining drive values.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A method of converting a three primary color input signal (Cx, Cy, Cz) into N drive signals (P1, ..., PN) for driving N>3 primary colors of a multi-primary color display, the display comprising a plurality of pixels with each pixel comprising N sub-pixels and each of the respective N drive signals (P1, ..., PN) supplied for driving a respective sub-pixel, the method comprises:
  determining, via a range circuit, a common range (VS) wherein the N drive signals (P1, ..., PN) all have valid values in a coordinate system defined by a minimum and maximum drive range and the N−3 drive signal(s) by performing the steps of (i) defining, via the range circuit, three functions representing three of the drive signals (P1, P2, P3) wherein each of the three functions is a function of the remaining N−3 drive signal(s) (P4, ..., PN), (ii) calculating, via the range circuit, the common range (VS) for the N−3 drive signal(s) in a space formed by the N−3 drive signal(s) (P4, ..., PN) wherein each one of the three functions representing three of the drive signals (P1, P2, P3) has valid values in the coordinate system, and (iii) calculating, via the range circuit, border values for the common range (VS),
  wherein the three functions are defined by $$\begin{bmatrix} P1 \\ P2 \\ P3 \end{bmatrix} = \begin{bmatrix} P1' \\ P2' \\ P3' \end{bmatrix} + \begin{bmatrix} k1,1 & \ldots & k1,N-3 \\ k2,1 & \ldots & k2,N-3 \\ k3,1 & \ldots & k3,N-3 \end{bmatrix} \times \begin{bmatrix} P4 \\ \ldots \\ PN \end{bmatrix}$$

wherein P1 to PN are the N drive signals, (P1', P2', P3') are defined by the color input signal, and the coefficients ki,j define a color-space dependence between three primaries associated with the three drive values (P1, P2, P3), and the other primaries associated with the N−3 drive signal(s) P4 to PN as defined by a product of color coordinates of the N primaries of the N sub-pixels, and
  selecting, via a selection circuit, a point from the common range (VS) according to a predetermined adaptable constraint (CON), wherein the selected point immediately defines the values of the N−3 drive signal(s), and substituting the selected point into each of the three functions to determine the N drive signals (P1, ..., PN), wherein the determining and selecting determines intersections of the three functions wherein the calculated intersections provide values in a space defined by the N−3 drive signal(s) which are used to determine the common range, and
  driving the display with the N drive signals (P1, ..., PN).

2. The method as claimed in claim 1, wherein the selecting is performed under a constraint (CON) for at least one aspect of at least one of the three drive signals (P1, P2, P3).

3. The method as claimed in claim 2, wherein the constraint (CON) is that one of the drive signals (P1, P2, P3, P4) is selected to have a minimum possible drive value.

4. The method as claimed in claim 2, wherein the constraint (CON) is a real time constraint determined by at least one of the group of: a temperature of the display, an amount of ambient light at the display, aging of the display, or a power consumption of the display.

5. The method as claimed in claim 1, wherein N=4, and wherein the three functions are defined by $$\begin{bmatrix} P1 \\ P2 \\ P3 \end{bmatrix} = \begin{bmatrix} P1' \\ P2' \\ P3' \end{bmatrix} + \begin{bmatrix} k1 \\ k2 \\ k3 \end{bmatrix} \times P4$$

wherein P1 to P4 are the four drive signals, (P1', P2', P3') are defined by the input color, and the coefficients ki define a dependence between three primaries associated with the three drive values P1, P2, P3, and the other primary associated with the fourth drive signal P4.

6. The method as claimed in claim 5, wherein the calculating calculates the common range (VS) on a line formed by the fourth drive signal (P4), and wherein the common range (VS) defines a range wherein each one of the three functions has valid values, wherein the range of valid values includes border values of (i) a lower border value (P4,min) and (ii) a higher border value (P4,max).

7. The method as claimed in claim 6, wherein the calculating of the common range (VS) comprises:
  calculating, for each one of the three functions, a lower border value of the fourth drive signal (P4) where a corresponding one of the three functions reaches one of the border values of the valid range, and a higher border value of the fourth drive signal (P4) where the corresponding one of the three functions reaches another border value of the valid range, and
  determining the common range (VS) from the respective lower and higher border values calculated for each of the three functions to obtain the respective lower and upper border values (P4,min, P4,max) for the common range (VS).

8. The method as claimed in claim 1, wherein all drive values (P1 to PN) are normalized and wherein valid ranges are defined as the values in the range from zero to one, including its borders.

9. A system for converting a three primary color input signal (Cx, Cy, Cz) into N drive signals (P1, ..., PN) for driving N>3 primary colors of a multi-primary color display, the display comprising a plurality of pixels with each pixel comprising N sub-pixels and each of the respective N drive signals (P1, ..., PN) supplied for driving a respective sub-pixel, the system comprising:

circuit means for determining a common range (VS) wherein the N drive signals (P1, ..., PN) all have valid values in a coordinate system defined by a minimum and maximum drive range and the N−3 drive signal(s), wherein the circuit means for determining the common range (VS) comprises (i) circuit means for defining three functions representing three of the drive signals (P1, P2, P3) wherein each of the three functions is a function of the remaining N−3 drive signal(s) (P4, ..., PN), (ii) circuit means for calculating the common range (VS) for the N−3 drive signal(s) in a space formed by the N−3 drive signal(s) (P4, ..., PN) wherein each one of the three functions representing three of the drive signals (P1, P2, P3) has valid values in the coordinate system, and (iii) circuit means for calculating border values for the common range (VS), wherein the three functions are defined by $$\begin{bmatrix} P1 \\ P2 \\ P3 \end{bmatrix} = \begin{bmatrix} P1' \\ P2' \\ P3' \end{bmatrix} + \begin{bmatrix} k1,1 & \ldots & k1,N-3 \\ k2,1 & \ldots & k2,N-3 \\ k3,1 & \ldots & k3,N-3 \end{bmatrix} \times \begin{bmatrix} P4 \\ \ldots \\ PN \end{bmatrix}$$

wherein P1 to PN are the N drive signals, (P1', P2', P3') are defined by the color input signal, and the coefficients ki,i define a color-space dependence between three primaries associated with the three drive values (P1, P2, P3), and the other primaries associated with the N−3 drive signal(s) P4 to PN as defined by a product of color coordinates of the N primaries of the N sub-pixels, and circuit means for selecting a point from the common range (VS) according to a predetermined adaptable constraint (CON), wherein the selected point immediately defines the values of the N−3 drive signal(s), and substituting the selected point in each of the three functions to determine the N drive signals (P1, ..., PN), wherein the determining and selecting determines intersections of the three functions wherein the calculated intersections provide values in a space defined by the N−3 drive signal(s) which are used to determine the common range, and circuit means for driving the display with the N drive signals (P1, ..., PN).

10. A display apparatus comprising a signal processing circuit for receiving an image input signal (IV) to supply the primary color input signal (Cx, Cy, Cz), the system as claimed in claim 9, and a display device for receiving the N drive signals (P1 to PN).

* * * * *